(12) United States Patent
Ishikawa et al.

(10) Patent No.: US 11,156,190 B2
(45) Date of Patent: Oct. 26, 2021

(54) OCCLUSION DIAGNOSIS DEVICE

(71) Applicant: HONDA MOTOR CO., LTD., Tokyo (JP)

(72) Inventors: Hiroki Ishikawa, Wako (JP); Michinori Tani, Wako (JP); Ikue Habu, Wako (JP); Daijiro Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 285 days.

(21) Appl. No.: 16/441,357

(22) Filed: Jun. 14, 2019

(65) Prior Publication Data

US 2019/0383240 A1 Dec. 19, 2019

(30) Foreign Application Priority Data

Jun. 19, 2018 (JP) .............................. JP2018-116322

(51) Int. Cl.
*F02M 25/08* (2006.01)
*B60K 15/035* (2006.01)

(52) U.S. Cl.
CPC ... *F02M 25/0809* (2013.01); *B60K 15/03504* (2013.01); *B60K 2015/0358* (2013.01)

(58) Field of Classification Search
CPC .............. F02M 25/08; F02M 25/0809; F02M 25/0836; F02M 25/0872; F02M 25/089; B60K 15/03504; B60K 2015/03561; B60K 2015/0358
USPC ........................................ 123/520; 73/114.39
See application file for complete search history.

(56) References Cited

U.S. PATENT DOCUMENTS

| | | | |
|---|---|---|---|
| 2002/0005061 A1* | 1/2002 | Grieve ............... | F02M 25/0809 73/49.7 |
| 2004/0000187 A1* | 1/2004 | Kobayashi ......... | F02M 25/0809 73/49.7 |
| 2006/0225714 A1* | 10/2006 | Kano ................. | F02M 25/0809 123/520 |
| 2009/0266147 A1* | 10/2009 | Maegawa ............... | G01F 22/02 73/40.7 |
| 2012/0215399 A1* | 8/2012 | Jentz ..................... | G01M 3/025 701/32.8 |

(Continued)

FOREIGN PATENT DOCUMENTS

JP 2014-126006 A 7/2014

*Primary Examiner* — John M Zaleskas
(74) *Attorney, Agent, or Firm* — Rankin, Hill & Clark LLP

(57) ABSTRACT

Occlusion diagnosis of a vent passage is executed with high accuracy based on an estimated value of the volume of a sealed space. An occlusion diagnosis device includes a diagnosis unit for the diagnosis. An occlusion diagnosis unit of the diagnosis unit executes the occlusion diagnosis, based on whether or not an estimated volume of a sealed space of a fuel-vapor sealing system exceeds a volume threshold. The occlusion diagnosis determines that the vent passage is suspected of being occluded if the estimated volume is equal to or less than the volume threshold, while diagnoses that the vent passage is not occluded if the estimated volume exceeds the volume threshold. If it is determined that the vent passage is suspected of being occluded, the occlusion diagnosis unit causes the occlusion diagnosis of the vent passage to remain incomplete until a cumulative exhaust amount of fluid exceeds an exhaust amount threshold.

12 Claims, 10 Drawing Sheets

(56) References Cited

U.S. PATENT DOCUMENTS

| | | | |
|---|---|---|---|
| 2013/0184963 A1* | 7/2013 | Jackson | F02M 25/0809 |
| | | | 701/101 |
| 2014/0019002 A1* | 1/2014 | Jentz | G01M 3/025 |
| | | | 701/32.8 |
| 2014/0102421 A1* | 4/2014 | Kato | F02M 25/0818 |
| | | | 123/520 |
| 2014/0174411 A1* | 6/2014 | Matsunaga | F02M 25/0809 |
| | | | 123/520 |
| 2014/0182360 A1 | 7/2014 | Horiba | |
| 2015/0013437 A1* | 1/2015 | Takakura | F02M 25/0818 |
| | | | 73/40.5 R |
| 2016/0215713 A1* | 7/2016 | Dudar | F02M 25/0809 |
| 2016/0215714 A1* | 7/2016 | Yang | F02M 25/089 |
| 2016/0356247 A1* | 12/2016 | Dudar | F02M 25/0827 |
| 2017/0037806 A1* | 2/2017 | Dudar | F02M 25/0836 |
| 2017/0096974 A1* | 4/2017 | Dudar | B60W 20/00 |
| 2017/0356360 A1* | 12/2017 | Dudar | F02D 41/0045 |
| 2018/0017022 A1* | 1/2018 | Murata | F02M 25/0809 |
| 2018/0100470 A1* | 4/2018 | Ooiwa | F02M 25/0836 |
| 2018/0274492 A1* | 9/2018 | Uchida | F02D 41/0042 |
| 2019/0101072 A1* | 4/2019 | Dudar | F02D 41/0035 |
| 2019/0120191 A1* | 4/2019 | Tani | F02D 33/003 |
| 2019/0120716 A1* | 4/2019 | Murata | G01M 3/2876 |
| 2019/0145857 A1* | 5/2019 | Ishikawa | G01M 3/26 |
| | | | 73/114.39 |

* cited by examiner

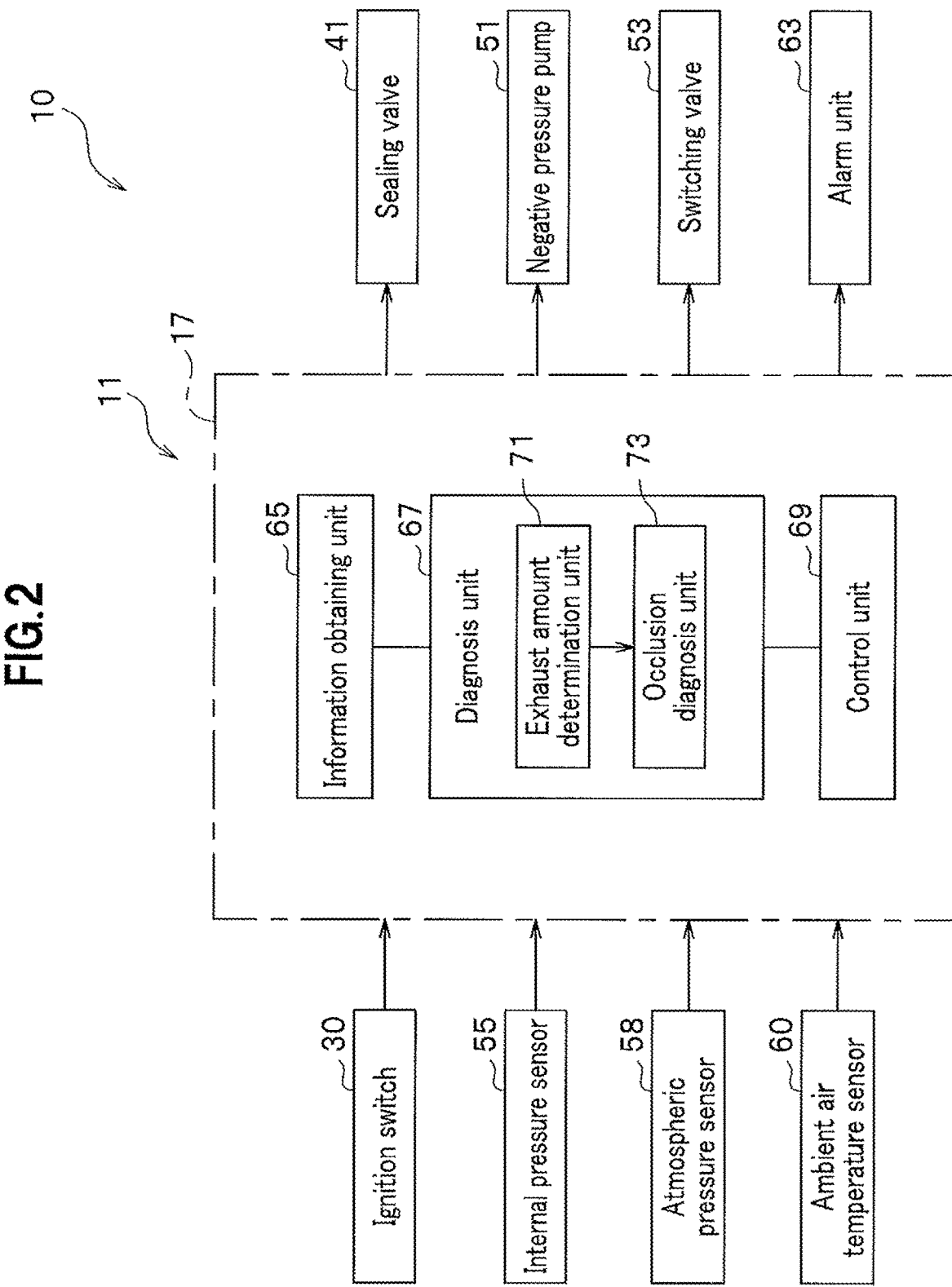

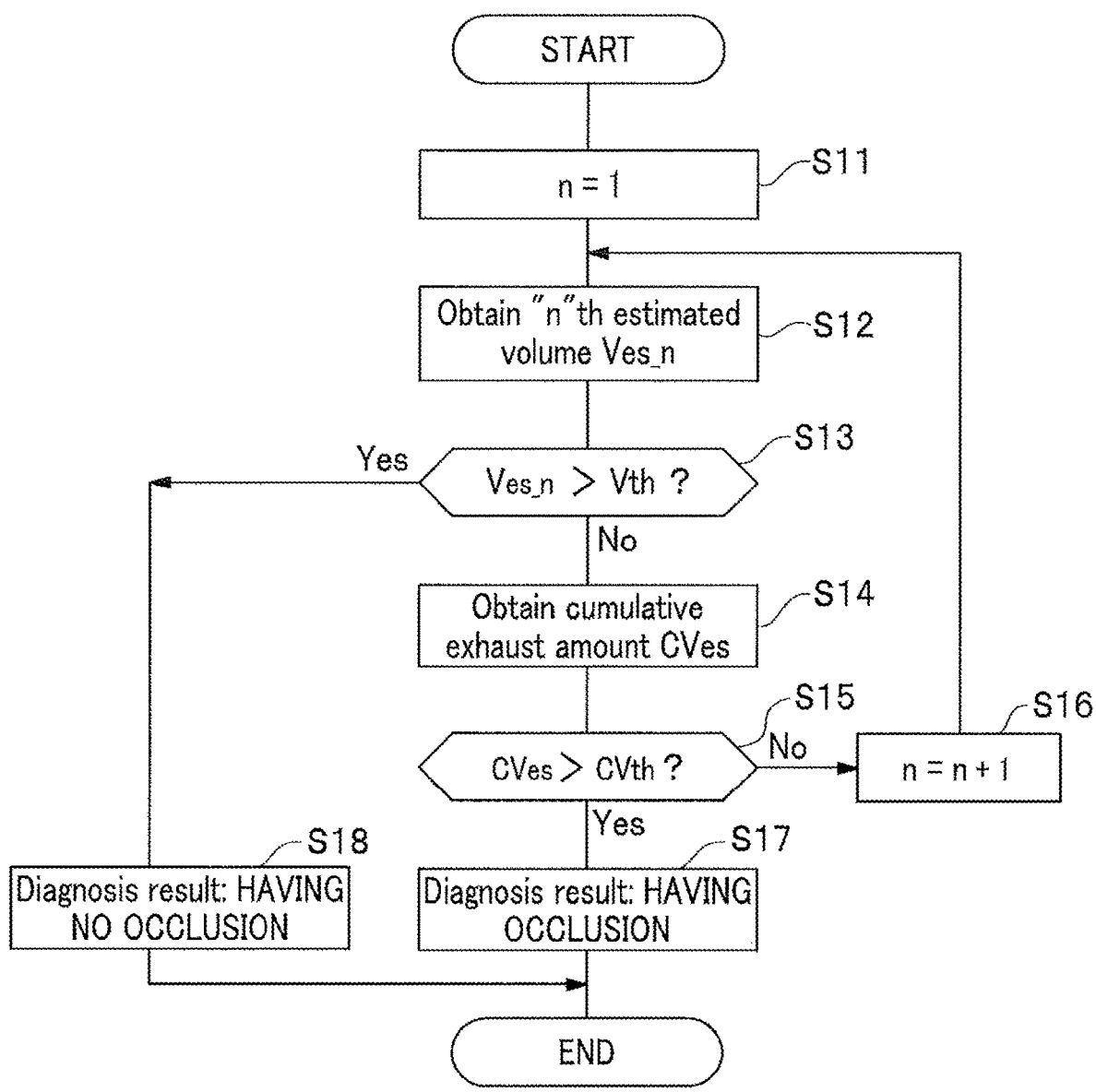

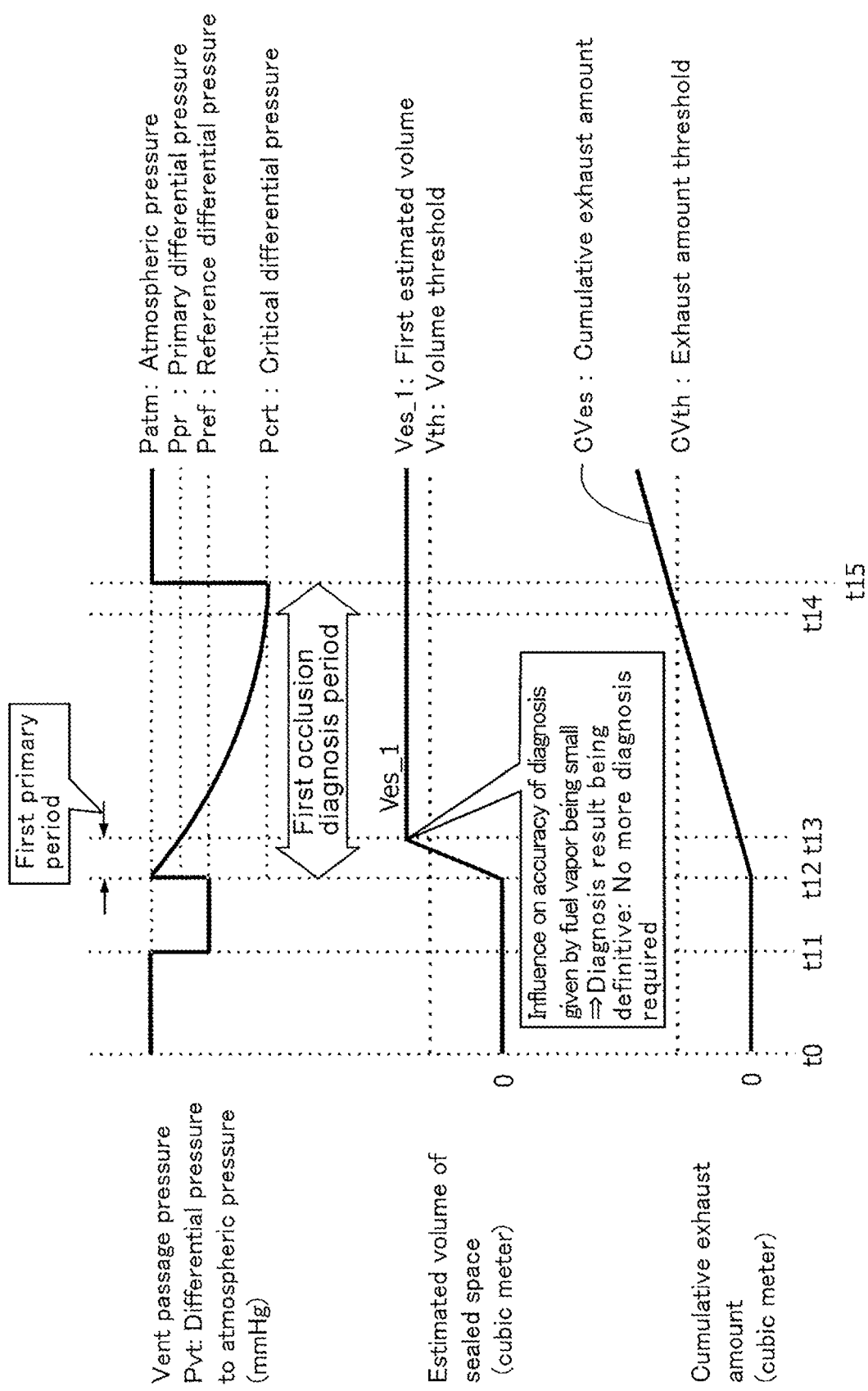

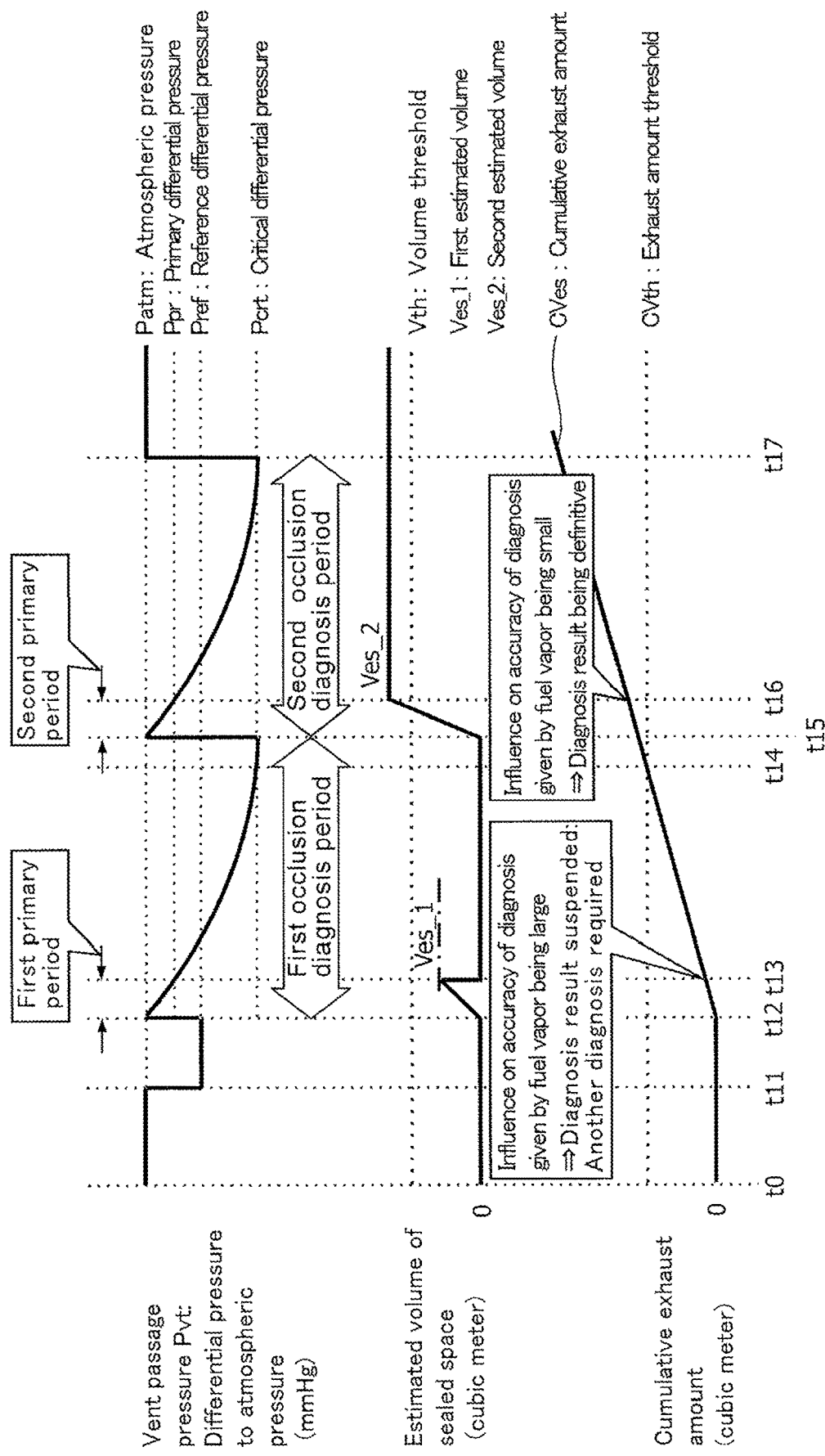

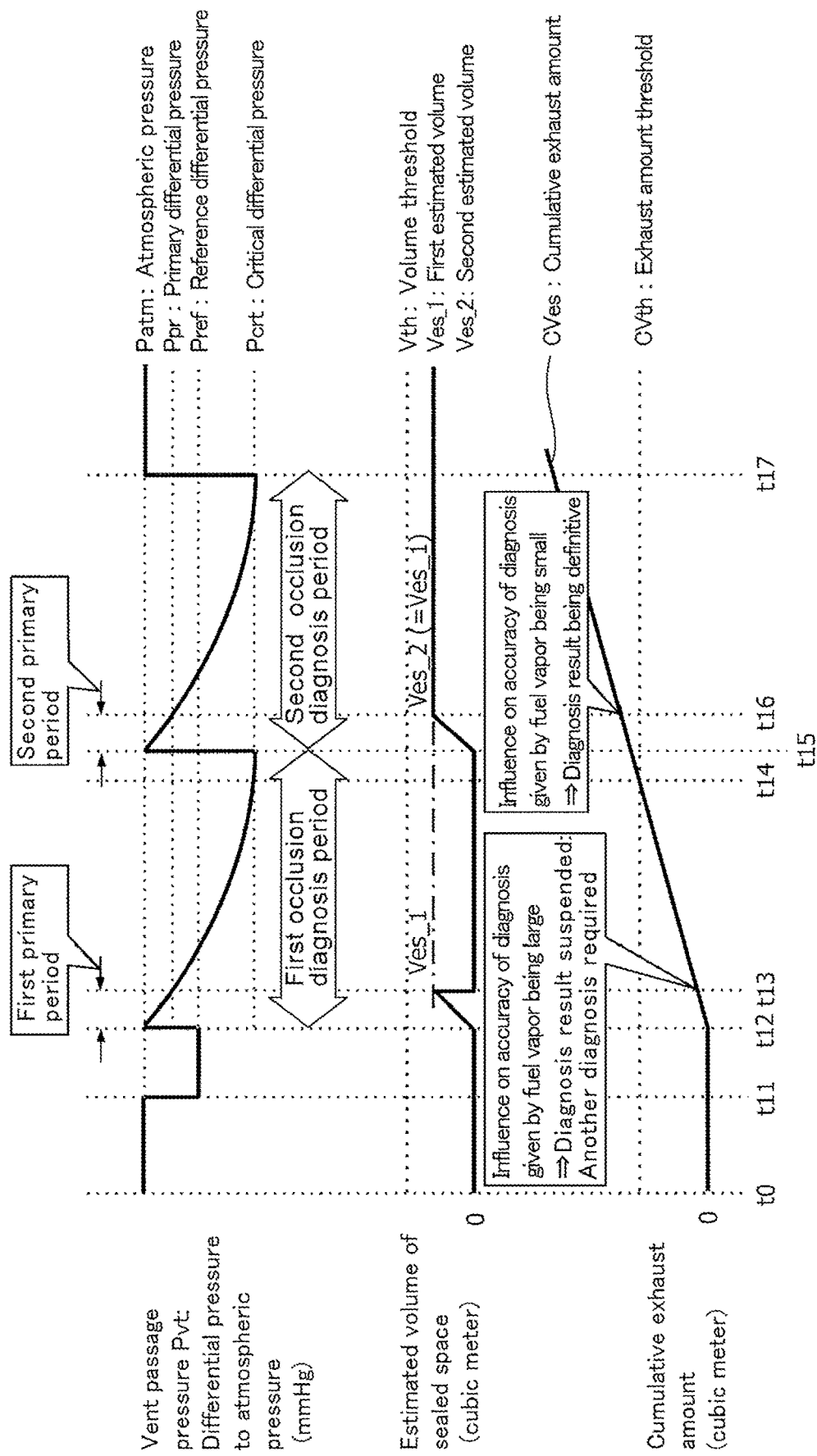

OCCLUSION DIAGNOSIS DEVICE

CROSS-REFERENCE TO RELATED APPLICATION

This application claims the benefit of priority to Japanese Patent Application No. 2018-116322 filed on 19 Jun. 2018, the disclosures of all of which are hereby incorporated by reference in their entireties.

TECHNICAL FIELD

The present invention relates to an occlusion diagnosis device that diagnoses occlusion of a vent passage communicating between an internal space of a fuel tank and a canister.

BACKGROUND OF THE INVENTION

In a vehicle equipped with an internal combustion engine, a volume occupied by liquid fuel increases in the internal space of a fuel tank when fuel is supplied to the fuel tank. This causes a volume of a gas phase region relatively to be decreased in the internal space, to make a pressure of the gas phase region (hereinafter referred to as a "tank internal pressure") higher than the atmospheric pressure. Then, the fuel vapor in the gas phase region, which has been accumulated in the fuel tank, tends to be exhausted into the atmosphere. If the fuel vapor is exhausted into the atmosphere, it will pollute the atmosphere.

Then, in order to prevent air pollution caused by fuel vapor being exhausted into the atmosphere, a conventional fuel tank system is arranged, in a vent passage communicating between the fuel tank and the atmosphere, with a canister having an adsorbent for adsorbing the fuel vapor so as to intervene between the fuel tank and the atmosphere and adsorb the fuel vapor with the adsorbent, so that the tank internal pressure is kept low while atmospheric pollution being prevented.

For example, a fuel-vapor processing device according to Japanese Patent Application Publication No. 2014-126006 (hereinafter, referred to as Patent Document 1) includes: a fuel tank; a canister; a sealing valve arranged in a fuel-vapor vent passage communicating between the fuel tank and the canister, to shut off the fuel tank from the atmosphere; and a diagnosis module having a function of diagnosing leakage in a fuel-vapor sealing system. The diagnosis module includes: a switching valve for opening or closing the canister to or from the atmosphere; an internal pressure sensor; a control unit for commanding opening or closing the sealing valve and switching valve; a diagnosis unit for diagnosing leakage in the fuel-vapor sealing system; and a negative pressure pump for generating pressure in the fuel-vapor sealing system.

The diagnosis unit of the diagnosis module diagnoses leakage in the whole fuel-vapor sealing system before diagnosing leakage on a canister side thereof. The diagnosis unit, in a state where the sealing valve is closed and the switching valve is closed, executes a function test including an error in opening the sealing valve, based on whether or not the negative pressure generated by the negative pressure pump causes values detected by the tank internal pressure sensor to be varied beyond a predetermined range.

The fuel-vapor processing device of Patent Document 1 is capable of suitably executing a function test including an error in opening the sealing valve.

SUMMARY OF THE INVENTION

Problems to be Solved

It is now assumed that the fuel-vapor processing device of Patent Document 1 has attempted to diagnose occlusion of the vent passage, in the state where the sealing valve is opened, using negative pressure by the negative pressure pump. In such a case, an operation unit time of the negative pressure pump is multiplied by a reference exhaust rate of the negative pressure pump, for example, to estimate an exhaust amount per unit time, that is, a volume of a sealed space of the fuel-vapor sealing system including the fuel tank and vent passage, and this allows for diagnosing occlusion of the vent passage based on whether or not the estimated value of the volume of the sealed space converges to a predetermined reference range.

However, studies by the inventors of the present application has proved that the estimated value of the volume of the sealed space of the fuel-vapor sealing system including the fuel tank and vent passage tends to be affected, and varies, by ambient factors such as an amount of the fuel vapor remaining in the fuel-vapor sealing system. If the estimated value of the volume of the sealed space varies under the influence from the ambient factors in this manner, accuracy of diagnosis is impaired when occlusion of the vent passage is diagnosed based on the estimated value of the volume of the sealed space.

The present invention has been made in view of the above situation, and is intended to provide an occlusion diagnosis device that is capable of diagnosing occlusion of a vent passage with high accuracy, based on an estimated value of a volume of a sealed space of a fuel-vapor sealing system including a fuel tank and a vent passage.

Solution to Problem

In order to achieve the above objective, a first aspect of the present invention provides an occlusion diagnosis device for use in a fuel tank system having a fuel tank for containing fuel, a canister for adsorbing fuel vapor generated in an internal space of the fuel tank, and a vent passage for communicating between the internal space of the fuel tank and the canister, to diagnose occlusion of the vent passage, and the occlusion diagnosis device includes: an information obtaining unit for obtaining information on internal pressure of the vent passage; a flow rate control unit for controlling a flow rate of fluid present in the vent passage, with a negative pressure source in operation; an exhaust amount determination unit for determining whether a cumulative exhaust amount of the fluid from a fuel-vapor sealing system inclusive of the fuel tank and the vent passage, with the negative pressure source in operation, exceeds a predetermined exhaust amount threshold; and an occlusion diagnosis unit for diagnosing occlusion of the vent passage, wherein in an occlusion diagnosis period in which occlusion of the vent passage is diagnosed, the negative pressure source is continuously operated over a predetermined unit length of time starting from activation of the negative pressure source, and the occlusion diagnosis unit estimates a volume of a sealed space of the fuel-vapor sealing system based on a length of time, within the occlusion diagnosis period, required to reduce the internal pressure of the vent passage by an amount of a primary differential pressure, with the negative pressure source in operation, and an exhaust rate of the fluid, and then diagnoses occlusion of the vent passage based on whether or not the estimated volume as a result of the estimation exceeds a preset volume threshold, to determine, as a tentative result, that the vent passage is suspected of being occluded if the estimated volume is equal to or less than the preset volume threshold, while to diagnose, as a definitive result, that the vent passage is not occluded if the estimated volume exceeds the volume threshold, wherein if it is determined, as a tentative result, that the vent passage is suspected of being occluded, the occlusion diagnosis of the vent passage remains incomplete until the cumulative exhaust amount of the fluid exceeds the predetermined exhaust amount threshold.

Advantageous Effects of the Invention

According to the present invention, occlusion of the vent passage is diagnosed with high accuracy, based on the estimated value of the volume of the sealed space of the fuel-vapor sealing system inclusive of the fuel tank and the vent passage.

BRIEF DESCRIPTION OF DRAWINGS

FIG. 2 is a functional block diagram of the occlusion diagnosis device according to the embodiment of the present invention;

FIG. 3 is a flowchart showing a flow of an occlusion diagnosis process executed by the occlusion diagnosis device according to the embodiment of the present invention;

FIG. 4A is a time chart showing temporal transition of respective values used in the occlusion diagnosis when the internal pressure of the vent passage in a normal state of having no occlusion is reduced by a negative pressure pump, in a case where the degree of influence on diagnosis accuracy given by the fuel vapor remaining in the fuel-vapor sealing system is small;

FIG. 4B is a time chart showing temporal transition of respective values used in the occlusion diagnosis when the internal pressure of the vent passage in a normal state of having no occlusion is reduced by the negative pressure pump, in a case where the degree of influence on diagnosis accuracy given by the fuel vapor remaining in the fuel-vapor sealing system is relatively large;

FIG. 4C is a time chart showing temporal transition of respective values used in the occlusion diagnosis when the internal pressure of the vent passage in a state of having occlusion is reduced by the negative pressure pump, in a case where the degree of influence on diagnosis accuracy given by the fuel vapor remaining in the fuel-vapor sealing system is relatively large;

EMBODIMENTS OF THE INVENTION

Figure 1A:
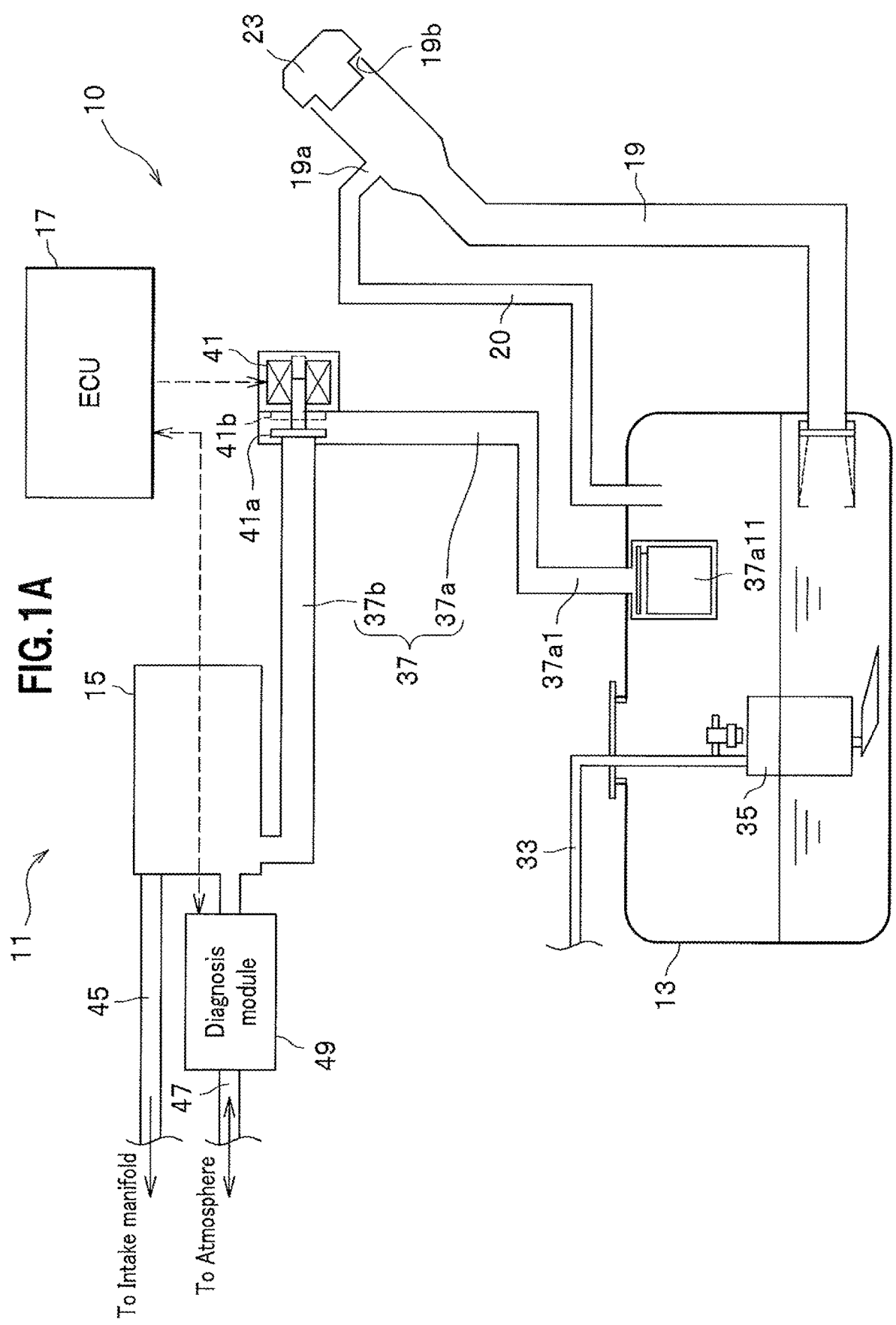
FIG. 1A is an overall configuration diagram showing an overview of an occlusion diagnosis device according to an embodiment of the present invention.

Hereinafter, an occlusion diagnosis device according to an embodiment of the present invention will be described in detail with reference to the drawings as appropriate.

Overview of Occlusion Diagnosis Device 11

First, an overview of an occlusion diagnosis device 11 according to the embodiment of the present invention will be described with reference to the drawings, by way of an example in which the occlusion diagnosis device 11, which is included in a fuel-vapor processing apparatus 10 to play a role of processing fuel vapor, is applied to a hybrid vehicle having an internal combustion engine and an electric motor (neither is shown).

Note that the same or corresponding members are denoted by the same reference numerals in the drawings referenced hereinafter. In addition, the size and shape of the members may be schematically represented by deformation or exaggeration for the purpose of illustration.

Figure 1B:
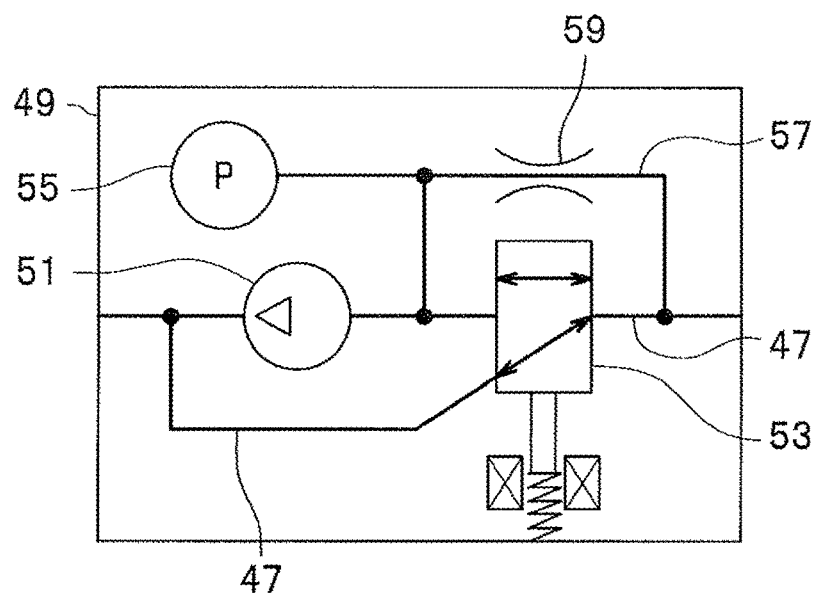
FIG. 1B is a schematic configuration diagram of a diagnosis module (normally used) in the occlusion diagnosis device according to the embodiment of the present invention.
Figure 1C:
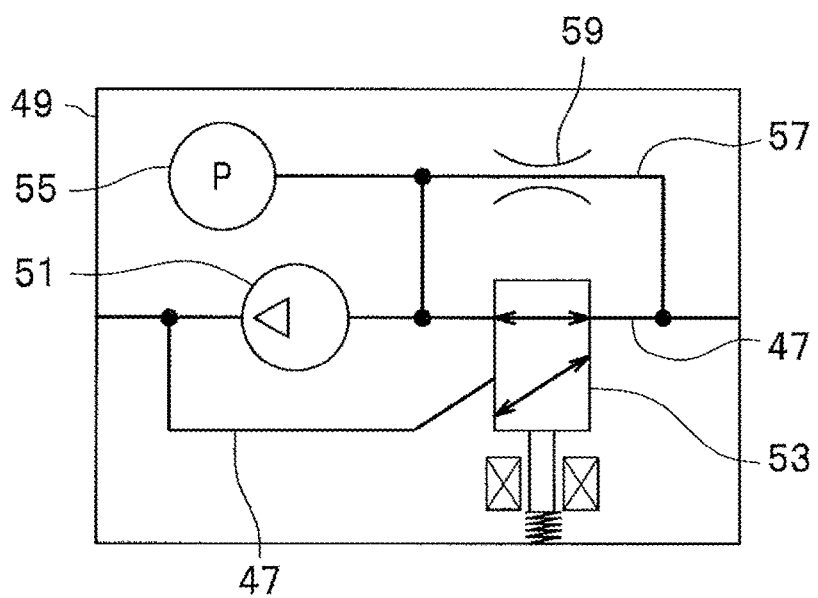
FIG. 1C is a schematic configuration diagram of the diagnosis module (during occlusion diagnosis) in the occlusion diagnosis device according to the embodiment of the present invention.

FIG. 1A is an overall configuration diagram showing an overview of the occlusion diagnosis device 11 according to the embodiment of the present invention. FIG. 1B is a schematic configuration diagram of a diagnosis module 49 (normally used) in the occlusion diagnosis device 11. FIG. 1C is a schematic configuration diagram of the diagnosis module 49 (during occlusion diagnosis) in the occlusion diagnosis device 11. FIG. 2 is a functional block diagram of the occlusion diagnosis device 11.

The fuel-vapor processing apparatus 10 inclusive of the occlusion diagnosis device 11 includes a fuel tank 13 for storing fuel such as gasoline, a canister 15 having a function of adsorbing fuel vapor generated in the fuel tank 13, and an ECU (Electronic Control Unit) 17 for generally controlling the occlusion diagnosis device 11, as shown in FIG. 1A.

The fuel tank 13 is provided with a fuel inlet pipe 19. The fuel inlet pipe 19 is arranged with a circulation pipe 20 to communicably connect an upstream portion 19a of the fuel inlet pipe 19 with the fuel tank 13. Provided on the opposite side of the fuel inlet pipe 19 from the fuel tank 13 is a fuel supply port 19b into which a nozzle (not shown) of a fuel supply gun (not shown) is inserted. A screw cap 23 is attached to the filling port 19b.

The fuel tank 13 is provided with a fuel pump module 35 that pumps up the fuel stored in the fuel tank 13 and delivers it to an injector (not shown) through a fuel supply passage 33. In addition, the fuel tank 13 is provided with a vent passage 37 to communicably connect the fuel tank 13 with the canister 15. The vent passage 37 has a function as a flow passage for the fuel vapor.

A communication passage 37a1 of the vent passage 37 to the fuel tank 13 is provided with a float valve 37a11. The float valve 37a11 works so as to be closed when a tank internal pressure, which is the pressure of a gas phase region in the fuel tank 13, increases due to a fuel level increasing with the fueling. Specifically, the float valve 37a11 is closed when the fuel tank 13 is full of fuel to prevent fuel from entering the communication passage 37a1 of the vent passage 37 from the fuel tank 13.

The vent passage 37 has a sealing valve 41 arranged in the middle thereof. Note that in the following description, a part of the vent passage 37 from the sealing valve 41 to the fuel tank 13 may be referred to as a first vent passage 37a, while another part of the vent passage 37 from the sealing valve 41 to the canister 15 may be referred to as a second vent passage 37b. Additionally, the first and second vent passages 37a, 37b are collectively referred to, when required, simply as the vent passage 37.

The sealing valve 41 has a function of shutting off the internal space of the fuel tank 13 from the atmosphere (see reference numeral 41a indicating a closed state in FIG. 1A) or allowing the fuel tank 13 to communicate with the atmosphere (see reference numeral 41b indicating an open state in FIG. 1A). Specifically, the sealing valve 41 is a normally closed electromagnetic valve that works in accordance with an open/close control signal sent from the ECU 17. The sealing valve 41 works to shut off the internal space of the fuel tank 13 from the atmosphere or allow the fuel tank 13 to communicate with the atmosphere, according to the open/close control signal.

The canister 15 arranged in the second vent passage 37b contains an adsorbent (not shown) made of activated carbon for adsorbing the fuel vapor. The adsorbent of the canister 15 adsorbs fuel vapor sent from the fuel tank 13 via the vent passage 37. The canister 15 has a purge passage 45 and an air introduction passage 47 connected thereto, in addition to the second vent passage 37b.

The canister 15 works to execute a purge process of sending the air taken in via the air introduction passage 47, along with the fuel vapor adsorbed by the adsorbent in the canister 15, to an intake manifold via the purge passage 45.

An opposite side of the purge passage 45 from the canister 15 is communicatively connected to the intake manifold (not shown). In contrast, an opposite side of the air introduction passage 47 from the canister 15 is connected to the atmosphere. The diagnosis module 49 is arranged in the air introduction passage 47.

The diagnosis module 49 is a functional member to be used for diagnosing leakage and occlusion of the fuel-vapor sealing system. The diagnosis module 49 includes the air introduction passage 47 and a bypass passage 57 arranged in parallel to the air introduction passage 47, as shown in FIGS. 1B and 1C. The air introduction passage 47 has a switching valve 53 arranged therein. The switching valve 53 has a function of opening or closing the canister 15 to or from the atmosphere. Specifically, the switching valve 53 is an electromagnetic valve that works in accordance with a switching signal sent from the ECU 17. The switching valve 53 allows the canister 15 to communicate with the atmosphere in a non-energized OFF state (see FIG. 1B), while shuts off the canister 15 from the atmosphere in an ON state where the switching signal is supplied from the ECU 17 (see FIG. 1C).

In contrast, the bypass passage 57 is arranged therein with a negative pressure pump 51, an internal pressure sensor 55, and a reference orifice 59. The negative pressure pump 51 is a constant volume pump having a constant exhaust volume per unit time. The negative pressure pump 51 has a function of exhausting the fluid present in the fuel-vapor sealing system to the atmosphere to make the internal pressure of the fuel-vapor sealing system negative with respect to an atmospheric pressure Patm. The negative pressure pump 51 corresponds to the "negative pressure source" of the present invention.

Here, the fuel-vapor sealing system refers to a closed space including the fuel tank 13, the vent passage 37, the sealing valve 41, the canister 15, the air introduction passage 47, and the diagnosis module 49. The fuel-vapor sealing system includes a fuel-tank-13 part and a canister-15 part. The fuel-tank-13 part is a closed space extending from the fuel tank 13 to the sealing valve 41 via the first vent passage 37a. The canister-15 part is a closed space extending from the sealing valve 41, through the canister 15 via the second vent passage 37b, to the diagnosis module 49 via the air introduction passage 47. Note that in the following description, the closed space of the fuel-vapor sealing system may sometimes be referred to as a "sealed space" for short The internal pressure sensor 55 has a function of detecting the internal pressure of the fuel-vapor sealing system. However, the internal pressure sensor 55 detects the atmospheric pressure Patm, in the case where the negative pressure pump 51 is not in suction operation in a state that the switching valve 53 is switched to a communication position of allowing the canister 15 to communicate with the atmosphere (see FIG. 1B).

In addition, the internal pressure sensor 55 detects a reference differential pressure Pref, in the case where the negative pressure pump 51 is in suction operation via the reference orifice 59 in a state that the switching valve 53 is switched to the communication position (see FIG. 4A, for example). The reference differential pressure Pref converges to a negative pressure value equivalent to that in the case where the negative pressure pump 51 is in suction operation in a state that a leak hole having the same diameter as a hole diameter "d" of the reference orifice 59 is open in the vent passage 37.

Such a converged, detected value (negative pressure value) by the internal pressure sensor 55 is stored as a leakage judgement threshold in a non-volatile memory (not shown) provided in the ECU 17. The leakage judgment threshold is used as a standard for diagnosing whether or not a leak hole having a size larger than the hole diameter "d" of the reference orifice 59 is open in the fuel-vapor sealing system. Note that the diameter "d" of the reference orifice 59 is set to an appropriate value in consideration of the diameter of a leak hole to be diagnosed.

Further, the internal pressure sensor 55 detects an internal pressure Pvt of the vent passage 37 (hereinafter, sometimes referred to as a "vent passage pressure Pvt" for short), in the case where the sealing valve 41 is opened (see reference numeral 41b to indicate an open state in FIG. 1A) to allow the fuel tank 13 to communicate with the canister 15 via the vent passage 37 in a state that the switching valve 53 is switched to a shut-off position of shutting off the canister 15 from the atmosphere (see FIG. 1C). In this case, the vent passage pressure Pvt is equal to the internal pressure of the fuel tank 13 and the internal pressure of the canister 15. The pressure information detected by the internal pressure sensor 55 is sent to the ECU 17.

The reference orifice 59 is used when the leakage judgement threshold is set for determining whether or not there is leakage, in the case of diagnosing leakage in the fuel-vapor sealing system. In addition, the reference orifice 59 is used when the reference exhaust rate Qref is calculated prior to the occlusion diagnosis. The details will be described later on the calculation procedure of the reference exhaust rate Qref.

The ECU 17 functions as the "information obtaining unit," the "flow rate control unit," the "exhaust amount determination unit," and the "occlusion diagnosis unit" of the present invention. The ECU 17 is connected thereto from an ignition switch 30, the internal pressure sensor 55, an atmospheric pressure sensor 58 having a function of detecting an atmospheric pressure Patm, and an ambient air temperature sensor 60 having a function of detecting an ambient air temperature To, collectively as an input system, as shown in FIG. 2. The atmospheric pressure information detected by the atmospheric pressure sensor 58 and the ambient air temperature information detected by the ambient air temperature sensor 60 are sent to the ECU 17.

Additionally, the ECU 17 is connected therefrom to the sealing valve 41, the negative pressure pump 51, the switching valve 53, and an alarm unit 63, collectively as an output system, as shown in FIG. 2. The alarm unit 63 has a function of alarming information about the leakage and occlusion diagnosis of the fuel-vapor sealing system. Specifically, the alarm unit 63 may be configured to suitably use a display unit (not shown) such as a liquid crystal display provided in a vehicle compartment and/or an audio output unit such as a speaker.

The ECU 17 is configured to include an information obtaining unit 65, a diagnosis unit 67, and a control unit 69, as shown in FIG. 2. The ECU 17 is configured with a microcomputer including a Central Processing Unit (CPU), a Read Only Memory (ROM), and a Random Access Memory (RAM). This microcomputer retrieves program and/or data stored in the ROM for execution to control various functions provided by the ECU 17, including an information obtaining function, an occlusion diagnosis function, and the function of generally controlling the occlusion diagnosis device 11 as a whole.

The information obtaining unit 65 has a function of obtaining pressure information in the vent passage 37, for example, detected by the internal pressure sensor 55, atmospheric pressure information detected by the atmospheric pressure sensor 58, and ambient air temperature information detected by the ambient air temperature sensor 60.

The diagnosis unit 67 has a function of diagnosing leakage and occlusion of the fuel-vapor sealing system. More specifically, the diagnosis unit 67 is configured to include an exhaust amount determination unit 71 and an occlusion diagnosis unit 73.

The exhaust amount determination unit 71 has a function of determining whether a cumulative exhaust amount CVes (see FIG. 3 and FIG. 4A etc.) of fluid (mixed gas of air/fuel-vapor), caused by depressurization by the negative pressure pump (negative pressure source) 51 during the occlusion diagnosis period, from the fuel-vapor sealing system including the fuel tank 13 and the vent passage 37, through the canister 15 and the air introduction passage 47, to the atmosphere exceeds a predetermined exhaust amount threshold CVth. The details will be described later on definitions and effects of the cumulative exhaust amount CVes and the exhaust amount threshold CVth.

The occlusion diagnosis unit 73 basically has a function of diagnosing occlusion of the vent passage 37. More specifically, the occlusion diagnosis unit 73 estimates a volume of a sealed space of the fuel-vapor sealing system, such as based on a time required to reduce the vent passage pressure Pvt by an amount of a primary differential pressure Ppr with respect to the atmospheric pressure Patm (see FIGS. 4A to 4C), within a primary period (see a first primary period defined as a period from time t12 to time t13 in FIG. 4A, and the like) of the occlusion diagnosis period (see the first occlusion diagnosis period defined as a period from time t12 to time t15 in FIG. 4A, and the like) in which occlusion of the vent passage 37 is diagnosed, with the negative pressure pump 51 in operation, and an exhaust rate of the fluid (details will be described later). In addition, the occlusion diagnosis unit 73 has a function of diagnosing occlusion of the vent passage 37, such as based on whether or not a first estimated volume Ves_1 and a second estimated volume Ves_2 (see FIGS. 4A to 4C), which are results from the estimation, each exceed a preset volume threshold Vth (see FIGS. 4A to 4C). Note that in the following description, the first and second occlusion diagnosis periods are collectively referred to, when required, simply as the "occlusion diagnosis period." Also, the first and second primary periods are collectively referred to, when required, simply as the "primary period." Additionally, the first and second estimated volumes Ves_1, Ves_2 are collectively referred to, when required, simply as the "estimated volume Ves." Details will be described later on effects of determining occlusion of the vent passage 37, and the volume threshold Vth.

Further, the occlusion diagnosis unit 73 has a function of determining leakage on presence or absence of very little leakage in the vent passage 37, such as based on whether or not the vent passage pressure Pvt at the end of the occlusion diagnosis period has reached a critical differential pressure Pcrt (see FIGS. 4A to 4C, and details will be described later) with respect to the atmospheric pressure Patm. Details will be described later on the leakage determination of the vent passage 37.

The control unit 69, for example, has a function of issuing an opening command to open the sealing valve 41 and issuing a shut-off command to shut off the switching valve 53, while the internal combustion engine is stopped. As an additional example, the control unit 69 has a function of controlling a flow rate of the fluid (mixed gas of air/fuel-vapor) present in the vent passage 37, with the negative pressure pump (negative pressure source) 51 in operation. The control unit 69 corresponds to the "flow rate control unit" in the present invention.

Operation of Occlusion Diagnosis Device 11

Next, operation of the occlusion diagnosis device 11 according to the embodiment of the present invention will be described with reference to FIG. 3. FIG. 3 is a flowchart showing the flow of the occlusion diagnosis process executed by the occlusion diagnosis device 11.

Note that FIG. 3 shows an example case where the occlusion diagnosis process is executed on the assumption that the ignition switch 30 is turned off and the ECU 17 is in a sleep mode. Here, the sleep mode of the ECU 17 refers to an operation mode of the ECU 17, for saving power, to have only a limited function of monitoring whether an elapsed time since the ignition switch 30 having been turned off exceeds a predetermined time. In addition, states of the sealing valve 41 and switching valve 53 during the occlusion diagnosis process are assumed that the sealing valve 41 is in an open state (see reference numeral 41b in FIG. 1A, indicating an open state), while the switching valve 53 is in a shut-off state (see FIG. 1C) to shut off the canister 15 from the atmosphere.

The occlusion diagnosis process diagnoses presence or absence of occlusion of the vent passage 37. Occlusion of the vent passage 37 can be in a form of an error in occlusion of the sealing valve 41, foreign matter being lodged in the vent passage 37, an error in occlusion of the float valve 37a11, or the like, for example. If there is occlusion of the vent passage 37, on the assumption that the suction operation of the negative pressure pump 51 is constant by constant flow control, a sealed space to have negative pressure applied therein has smaller volume as compared with a normal case of the vent passage 37 having no occlusion. Therefore, the occlusion diagnosis process estimates the volume of the sealed space, based on a time required for the vent passage pressure Pvt being reduced, with the negative pressure pump 51 in operation, and the exhaust rate of the fluid, and then diagnoses presence or absence of occlusion of the vent passage 37, based on whether or not the estimated volume Ves of the sealed space exceeds the volume threshold Vth (see FIGS. 4A to 4C). Note that in the flowchart shown in FIG. 3, the words "determination" and "diagnosis" coexist. On this point, the description of the occlusion diagnosis device 11 according to the embodiment of the present invention is intended to give a tentative result by the word "determination" while to give a definitive result by the word "diagnosis," so that the word "diagnosis" is defined to have larger weight than the word "determination."

In step S11 shown in FIG. 3, the diagnosis unit 67 of the ECU 17 initializes the value of the occlusion diagnosis counter "n" to "1." This prepares for executing the occlusion diagnosis process. Here, the occlusion diagnosis counter "n" indicates the number of occlusion diagnoses, each taking a predetermined occlusion diagnosis time, after a time for calculating the reference exhaust rate Qref has elapsed. The initial value of the occlusion diagnosis counter "n" is one. The value of the occlusion diagnosis counter "n" is stored in a storage unit (not shown) provided in the ECU 17.

In step S12, the diagnosis unit 67 of the ECU 17 obtains a "n"th estimated volume Ves_n of the sealed space (closed space of the fuel-vapor sealing system). Note that processing of obtaining the "n"th estimated volume Ves_n in step S12 may be executed in parallel with the occlusion diagnosis process. Here, the "n"th estimated volume Ves_n corresponds to the first estimated volume Ves_1 or the second estimated volume Ves_2 in the example shown in FIG. 4B.

The first estimated volume Ves_1 is a volume of a sealed space estimated based on a length of time (|t12−t31|: see FIG. 4B, for example), of the first primary period (see the period from time t12 to time t13 in FIG. 4B, where the length of time of the first primary period is shorter than that of the first occlusion diagnosis period) of the first occlusion diagnosis period (see the period from time t12 to time t15 in FIG. 4B), required to reduce the vent passage pressure Pvt by an amount of the primary differential pressure Ppr (=P(t12)−P(t13): see FIG. 4B, for example), with the negative pressure pump 51 suctioning the fluid present in the sealed space where the vent passage pressure Pvt is reset to the atmospheric pressure Patm, and the reference exhaust rate Qref. Note that details will be described later on the calculation procedure of the first estimated volume Ves_1. The first occlusion diagnosis period is a period for the occlusion diagnosis of the vent passage 37 and sequentially comes after a period for calculating the reference exhaust rate Qref (see the period from time t11 to time t12 in FIG. 4B).

Similarly, the second estimated volume Ves_2 is a volume of a sealed space estimated based on a length of time (|t15−t16|: see FIG. 4B, for example), of the second primary period (see the period from time t15 to time t16 in FIG. 4B, where the length of time of the second primary period is shorter than that of the second occlusion diagnosis period) of the second occlusion diagnosis period (see the period from time t15 to time t17 in FIG. 4B), required to reduce the vent passage pressure Pvt by an amount of the primary differential pressure Ppr (=P(t15)−P(t16): see FIG. 4B, for example), with the negative pressure pump 51 suctioning the fluid present in the sealed space where the vent passage pressure Pvt is reset to the atmospheric pressure Patm, and the reference exhaust rate Qref. Note that details will be described later on the calculation procedure of the second estimated volume Ves_2. The second occlusion diagnosis period is a period for the occlusion diagnosis of the vent passage 37, and sequentially comes after the first occlusion diagnosis period.

The reference exhaust rate Qref is a predicted value (L/sec) of the flow rate expected to have when the vent passage 37 is depressurized by the negative pressure pump 51. The exhaust rate may be measured when the negative pressure pump 51 suctioning the fluid present in the vent passage 37 through the reference orifice 59, and then used as the reference exhaust rate Qref. Note that the reference exhaust rate Qref has a linear correlation with the internal pressure Pvt in the vent passage 37 (hereinafter, may be referred to as the "vent passage pressure Pvt" for short). Therefore, a value corrected according to the change in the vent passage pressure Pvt may be adopted as the reference exhaust rate Qref, where appropriate.

In step S13, the diagnosis unit 67 of the ECU 17 makes determination on occlusion of the vent passage 37, based on whether or not the "n" th estimated volume Ves_n obtained in step S12 exceeds the preset volume threshold Vth (see FIG. 4B, for example).

If it is determined that the "n"th estimated volume Ves_n exceeds the volume threshold Vth ("Yes" in step S13) as a result of the determination on occlusion in step S13, the diagnosis unit 67 of the ECU 17 causes the process flow to jump to step S18.

In contrast, if it is determined that the "n"th estimated volume Ves_n does not exceed the volume threshold Vth as a result of the determination on occlusion in step S13 ("No" in step S13), the diagnosis unit 67 of the ECU 17 presumes that the vent passage 37 is suspected of being occluded, and causes the process flow to advance to the next step S14.

In step S14, the exhaust amount determination unit 71 in the diagnosis unit 67 of the ECU 17 obtains the cumulative exhaust amount CVes of fluid (mixed gas of air/fuel-vapor) from the fuel-vapor sealing system, including the fuel tank 13 and the vent passage 37, at the end of the "n"th primary period (see time t13 in FIGS. 4A to 4C). Note that the process of obtaining the cumulative exhaust amount CVes in step S14 may be executed in parallel with the occlusion diagnosis process. Here, the cumulative exhaust amount CVes refers to a cumulative value of the exhaust amount of fluid (mixed gas of air/fuel-vapor) from the fuel-vapor sealing system into the atmosphere due to depressurization by the negative pressure pump 51 at a predetermined time point within the occlusion diagnosis period (the first and second occlusion diagnosis periods in examples in FIGS. 4B and 4C). In order to obtain the cumulative exhaust amount CVes, the length of time (seconds) from the beginning of the occlusion diagnosis period to a predetermined time point may be multiplied by the reference exhaust rate Qref (liter/second), for example.

The purpose of obtaining the cumulative exhaust amount CVes is as follows. That is, the cumulative exhaust amount CVes reaching a value equivalent to the volume of the sealed space of the fuel-vapor sealing system, for example, means that the fuel vapor remaining in the sealed space of the fuel-vapor sealing system is exhausted into the atmosphere due to depressurization by the negative pressure pump 51 for the occlusion diagnosis of the vent passage 37, to reduce density of the fuel vapor remaining in the sealed space. This is meant for reducing the degree of influence on accuracy of diagnosing occlusion of the vent passage 37 given by the fuel vapor remaining in the sealed space.

Then, the occlusion diagnosis device 11 according to the embodiment of the present invention is configured to obtain the cumulative exhaust amount CVes in all the occlusion diagnosis periods, and to cause the occlusion diagnosis of the vent passage 37 to remain incomplete until the obtained cumulative exhaust amount CVes exceeds the exhaust amount threshold CVth. Note that the exhaust amount threshold CVth may be set, where appropriate, to a value equivalent to the volume of the closed space in the fuel-vapor sealing system, for example.

In step S15, the exhaust amount determination unit 71 in the diagnosis unit 67 of the ECU 17 executes determination on the exhaust amount of whether or not the cumulative exhaust amount CVes obtained in step S14 exceeds the exhaust amount threshold CVth.

If it is determined that the cumulative exhaust amount CVes does not exceed the exhaust amount threshold CVth ("No" in step S15) as a result of the determination on the exhaust amount in step S15, the exhaust amount determination unit 71 in the diagnosis unit 67 of the ECU 17 causes the process flow to proceed to the next step S16.

In contrast, if it is determined that the cumulative exhaust amount CVes exceeds the exhaust amount threshold CVth ("Yes" in step S15) as a result of the determination on the exhaust amount in step S15, the exhaust amount determination unit 71 in the diagnosis unit 67 of the ECU 17 causes the process flow to jump to step S17.

In step S16, the diagnosis unit 67 of the ECU 17 adds "1" to the value of the occlusion diagnosis counter "n." The diagnosis unit 67 of the ECU 17 then causes the flow of the process to return to step S12 and sequentially execute subsequent processing.

In step S17, the occlusion diagnosis unit 73 in the diagnosis unit 67 of the ECU 17 diagnoses that there is occlusion of the vent passage 37. The diagnosis unit 67 of the ECU 17 then ends a series of occlusion diagnosis processing.

In step S18 on another path, the occlusion diagnosis unit 73 in the diagnosis unit 67 of the ECU 17 diagnoses that there is no occlusion of the vent passage 37. The diagnosis unit 67 of the ECU 17 then ends a series of occlusion diagnosis processing.

Chronological Operation of Occlusion Diagnosis Device 11

Next, chronological operation of the occlusion diagnosis device 11 of the embodiment of the present invention will be described in more detail with reference to FIGS. 4A to 4C.
<Case 1: Diagnosis Resulted in HAVING NO OCCLUSION>
First, chronological operation by the occlusion diagnosis device 11 in Case 1 (diagnosis resulted in HAVING NO OCCLUSION) will be described with reference to FIG. 4A. FIG. 4A is a time chart showing temporal transition of respective values used in the occlusion diagnosis when the vent passage pressure Pvt in a normal state of having no occlusion is reduced by the negative pressure pump 51, in a case where the degree of influence on diagnosis accuracy given by the fuel vapor remaining in the fuel-vapor sealing system is small.

During a period from time t11 to time t12 in FIG. 4A, the reference exhaust rate Qref is calculated. For this calculation, the negative pressure pump 51 is operated for suctioning in a state where the switching valve 53 of the diagnosis module 49 is turned off to allow the canister 15 to communicate with the atmosphere (see FIG. 1B). By way of this suction operation, the internal pressure sensor 55 detects the reference differential pressure Pref (see FIG. 4A, for example) which is negative pressure with respect to the atmospheric pressure Patm.

The hole diameter "d" of the reference orifice 59 is known. For this reason, the reference exhaust rate Qref can be calculated using following Equation (1).

$$Q\text{ref} = \pi d^2/4 \ast A \ast \sqrt{2 \Delta P / \rho} \qquad (1)$$

where definitions of respective values in Equation (1) are as follows:
π Circular constant;
d Hole diameter of reference orifice 59 (m);
A Flow coefficient;
ΔP Pressure difference (Pa); and
ρ Air density (g/m3).

The flow coefficient A is a coefficient for correcting the theoretical flow rate to an actual flow rate. The flow coefficient A may have a variable value in accordance with changes in the vent passage pressure Pvt. The pressure difference ΔP is a differential pressure (Patm−Pvt) between the atmospheric pressure Patm and the vent passage pressure Pvt. The air density ρ is calculated by following Equation (2).

$$\rho = P\text{atm}/R \ast (\text{To} + 273.15) \qquad (2),$$

where definitions of respective values in Equation (2) are as follows:
Patm Atmospheric pressure (Pa);
R Gas constant of dry air (equals to 2.87);
To Ambient temperature (° C.); and
273.15 Conversion value for converting Celsius to absolute temperature.

As described above, Equations (1) and (2) are used to calculate the reference exhaust rate Qref of the fluid in the vent passage 37.

During a period from time t12 to time t15 (first occlusion diagnosis period) in FIG. 4A, the occlusion diagnosis process is executed. In this occlusion diagnosis process, the negative pressure pump 51 is operated for suctioning in a state where the switching valve 53 of the diagnosis module 49 is turned on to shut off the canister 15 from the atmosphere (see FIG. 1C). By way of this suction operation, the vent passage pressure Pvt as a value detected by the internal pressure sensor 55 gradually decreases on a downward trend to around the critical differential pressure Pcrt which is negative pressure with respect to the atmospheric pressure Patm.

In the first primary period from time t12 to time t13 of a period from time t12 to time t15 (i.e., the first occlusion diagnosis period), the first estimated volume Ves_1 is calculated using following Equation (3), based on a first length of time Δt1 (equals to |t12−t13|) required to reduce the pressure of the vent passage by an amount of the primary differential pressure Ppr (equals to P(t12)−P(t13): see FIG. 4A), with the negative pressure pump 51 suctioning the fluid present in the sealed space where the vent passage pressure Pvt is reset to the atmospheric pressure Patm, and the reference exhaust rate Qref.

$$Ves\_1 = (P\text{atm}/Ppr) \cdot Q\text{ref} \cdot \Delta t1 \qquad (3),$$

where definitions of respective values in Equation (3) are as follows:
Ves_1 First estimated volume (cube meter);
Patm Atmospheric pressure (Pa);

Ppr Primary differential pressure value=P(t12)−P(t13) (Pa);
Qref Reference exhaust rate (L/sec); and
Δt1 First length of time=|t12−t13| (sec).

In Case 1, the magnitude of the first estimated volume Ves_1 is compared with that of the volume threshold Vth in FIG. 4A to make determination on occlusion of the vent passage 37. Here, the volume threshold Vth in FIG. 4A is a value to be used when determination on occlusion of the vent passage 37 is made based on the estimated value of the volume of the sealed space. In the occlusion diagnosis device 11 of the embodiment of the present invention, the specification of the sealed space is preset at the design stage. Therefore, the theoretical value of the volume of the sealed space obtained by using this designed specification may be adopted as the volume threshold Vth. Alternatively, a value obtained through simulation and/or experiment may be adopted as the volume threshold Vth. Further, instead of the theoretical value or the value obtained through simulation and/or experiment, a value obtained by adding a margin to one of these values, in consideration of an error, may be adopted as the volume threshold Vth.

In the example shown in FIG. 4A, the first estimated volume Ves_1 exceeds the volume threshold Vth at time t13 as the end of the first primary period. The principle of determination on occlusion of the vent passage 37 is as follows. That is, if there is no occlusion of the vent passage 37, the length of time Δt1 required to reduce the pressure of the vent passage by an amount of a predetermined differential pressure relatively tends to be longer. This causes an amount of the fluid flown during depressurization, that is, the first estimated volume Ves_1 relatively tends to be larger. In such a case, the first estimated volume Ves_1 exceeds the volume threshold Vth. This lead to determination of "HAVING NO OCCLUSION" in the vent passage 37.

In contrast, if there is occlusion of the vent passage 37, the length of time Δt1 required to reduce the pressure of the vent passage by an amount of a predetermined differential pressure relatively tends to be shorter. This causes an amount of fluid flown during depressurization, that is, the first estimated volume Ves_1 relatively tends to be smaller. In such a case, the first estimated volume Ves_1 does not reach the volume threshold Vth. This leads to determination of "HAVING OCCLUSION" in the vent passage 37.

In Case 1, the magnitude of the first estimated volume Ves_1 is compared with that of the volume threshold Vth to make determination on occlusion of the vent passage 37. The determination on occlusion of the vent passage 37 is "HAVING NO OCCLUSION" in the first occlusion diagnosis period.

This means that the degree of influence on accuracy of diagnosing occlusion of the vent passage 37 given by the fuel vapor remaining in the fuel-vapor sealing system is small (no more diagnosis is needed). As a result, Case 1 is diagnosed as "HAVING NO OCCLUSION" at time t13.

Incidentally in Case 1, the cumulative exhaust amount CVes exceeds the exhaust amount threshold CVth at time t14 during a period from time t12 to time t15 (i.e., the first occlusion diagnosis period). However, when the diagnosis result of "HAVING NO OCCLUSION" is made at time t13, no consideration is made in Case 1 on whether or not the cumulative displacement CVes exceeds the exhaust amount threshold CVth. However, such a configuration may be adopted in that both of the result of "HAVING NO OCCLUSION" from determination on occlusion at time t13 and the fact of the cumulative displacement CVes exceeding the exhaust amount threshold CVth at time t14 are considered to make diagnosis of "HAVING NO OCCLUSION" at time t14.

Case 1 described above corresponds to the process flow in FIG. 3 of "Yes" in step S13 and then to step 18 of "HAVING NO OCCLUSION" in the vent passage 37. In Case 1, the definitive diagnosis result of "HAVING NO OCCLUSION" is made at time t13 in FIG. 4A.

<Case 2: Diagnosis Resulted in HAVING NO OCCLUSION>

Next, chronological operation by the occlusion diagnosis device 11 in Case 2 (diagnosis resulted in HAVING NO OCCLUSION) will be described with reference to FIG. 4B. FIG. 4B is a time chart showing temporal transition of respective values used in the occlusion diagnosis when the vent passage pressure Pvt in a normal state of having no occlusion is reduced by the negative pressure pump 51, in a case where the degree of influence on diagnosis accuracy given by the fuel vapor remaining in the fuel-vapor sealing system is relatively large. There are mutually common operational parts between the chronological operation in Case 1 and that in Case 2. Therefore, the description will be focused on differences between the two, to substitute description on operation in Case 2.

During a period from time t11 to time t12 in FIG. 4B, the reference exhaust rate Qref is calculated as in Case 1 shown in FIG. 4A.

During a period from time t12 to time t15 (i.e., the first occlusion diagnosis period) in FIG. 4B, the occlusion diagnosis process is executed as in Case 1.

In the first primary period from time t12 to time t13 of the period from time t12 to time t15 (i.e., the first occlusion diagnosis period), the first estimated volume Ves_1 is calculated using the same procedure as in Case 1. The magnitude of the first estimated volume Ves_1 is compared with that of the volume threshold Vth, to make determination on occlusion of the vent passage 37. The result of determination on occlusion of the vent passage 37 in the first occlusion diagnosis period is "HAVING OCCLUSION."

This means that the degree of influence on accuracy of diagnosing occlusion of the vent passage 37 given by the fuel vapor remaining in the fuel-vapor sealing system is relatively large (another diagnosis is required). As a result, the determination of "DIAGNOSIS PENDING (ANOTHER DIAGNOSIS REQUIRED)" is made in Case 3, to be described later, at time t13, as in Case 2.

In Case 2 shown in FIG. 4B, the cumulative exhaust amount CVes exceeds the exhaust amount threshold CVth at time t14 during a period from time t12 to time t15 (first occlusion diagnosis period), as in Case 1. As a result, the degree of influence on accuracy of diagnosing occlusion of the vent passage 37 given by the fuel vapor remaining in the fuel-vapor sealing system is sufficiently small at time t14 in Case 2.

In the second primary period from time t15 to time t16 of a period from time t15 to time t17 (i.e., the second occlusion diagnosis period), the second estimated volume Ves_2 is calculated using the same calculation procedure as with the first estimated volume Ves_1. The magnitude of the second estimated volume Ves_2 is compared with that of the volume threshold Vth, to make determination on occlusion of the vent passage 37. The result of determination on occlusion of the vent passage 37 in the second occlusion diagnosis period is "HAVING NO OCCLUSION" which is different from that in the first occlusion diagnosis period.

This means that the degree of influence on accuracy of diagnosing occlusion of the vent passage 37 given by the fuel vapor remaining in the fuel-vapor sealing system is relatively large (another diagnosis has been made). As a result, Case 2 is diagnosed at time t16 as "HAVING NO OCCLUSION," in taking account of the result of the determination on occlusion of "HAVING NO OCCLUSION" at time t16 and the fact that the cumulative exhaust amount CVes has exceeded the exhaust amount threshold CVth.

Case 2 described above corresponds to a process flow of "No in step S13," "No in step S15," "Yes in step S13," and "NO OCCLUSION of the vent passage 37 in step S18" in FIG. 3. Case 2 is definitively diagnosed as "HAVING NO OCCLUSION" at time t16 in FIG. 4B.

Here, a description will be given of a mechanism in Case 2 of the result of determination on occlusion of the vent passage 37 being "HAVING OCCLUSION" in the first occlusion diagnosis period, but that being "HAVING NO OCCLUSION" in the second occlusion diagnosis period, with reference to FIGS. 5A to 5C.

Figure 5A:
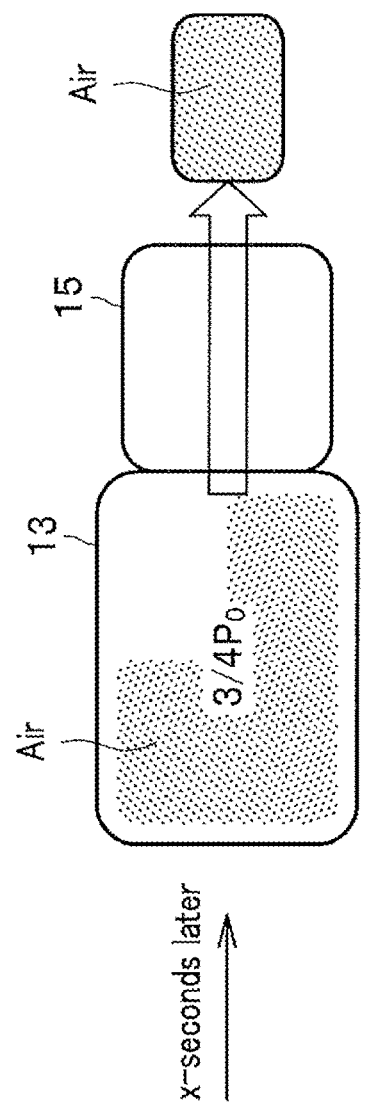
FIG. 5A is an illustration conceptually showing a mechanism of a change in internal pressure when a sealed space is depressurized by a negative pressure pump for a predetermined time, in a case where no fuel vapor remains in a fuel tank.
Figure 5B:
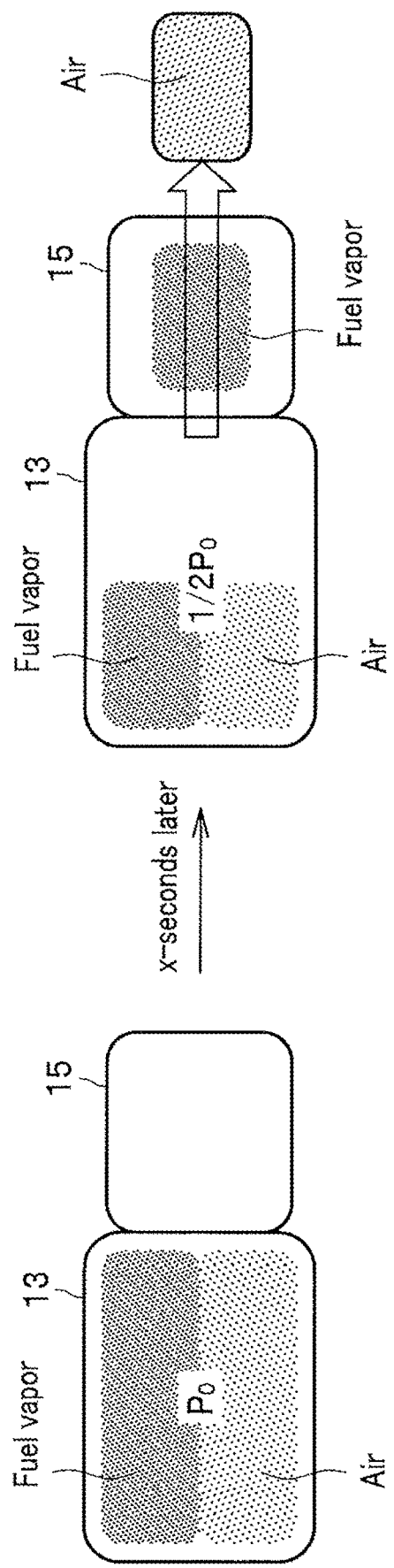
FIG. 5B is an illustration conceptually showing a mechanism of a change in internal pressure when the sealed space is depressurized by the negative pressure pump for the predetermined time, in a case where fuel vapor remains in the fuel tank.

FIG. 5A is an illustration conceptually showing a mechanism of a change in the vent passage pressure Pvt when the sealed space is depressurized by the negative pressure pump 51 for a predetermined time, in a case where no fuel vapor remains in the fuel tank 13. FIG. 5B is an illustration conceptually showing a mechanism of a change in the vent passage pressure Pvt when the vent passage 37 is depressurized by the negative pressure pump 51 for a predetermined time, in a case where fuel vapor remains in the fuel tank 13. FIG. 5C is a chart contrasting the temporal change in the internal pressure in the case where fuel vapor remains in the fuel tank 13 with that in the case where no fuel vapor remains in the fuel tank 13.

A case will be studied now where no fuel vapor remains in the fuel tank 13 (the fuel tank 13 is filled with air). The vent passage pressure Pvt is assumed to be "Po" as shown in FIG. 5A. In this state, the negative pressure pump 51 is used to depressurize a sealed space (including the fuel tank 13, the vent passage 37, and the canister 15) for a predetermined time (x seconds). In this case, a predetermined volume of air is exhausted out of the sealed space after x seconds, as shown in FIG. 5A. This is because the negative pressure pump 51 is a constant volume pump. As a result, the vent passage pressure Pvt is reduced to "three fourths of Po" (see FIG. 5C). No fuel vapor is adsorbed in the canister 15. This is because no fuel vapor remains in the fluid exhausted out of the sealed space through the canister 15 due to the sealed space having been depressurized.

Next, a case will be studied where fuel vapor remains in the fuel tank 13 (the fuel tank 13 is filled with a mixed fluid of air/fuel-vapor). The vent passage pressure Pvt is assumed to be "Po" as in the case described above, as shown in FIG. 5B. In this state, the sealed space is depressurized by the negative pressure pump 51 for a predetermined time (x seconds). In this case, a predetermined volume of air is exhausted out of the sealed space after x seconds, as shown in FIG. 5B. This is because the negative pressure pump 51 is a constant volume pump. In addition, fuel vapor is adsorbed in the canister 15 and condensed (the volume is reduced). This is because the fuel vapor remains in the fluid exhausted out of the sealed space through the canister 15 due to the sealed space having been depressurized. As a result, the vent passage pressure Pvt is reduced to "a half of Po" (see FIG. 5C).

Figure 5C:
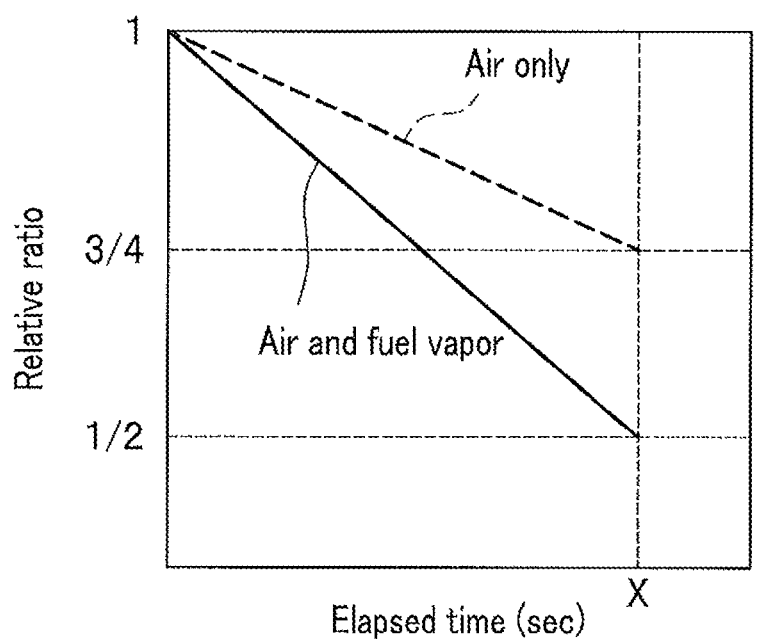
FIG. 5C is a chart contrasting the temporal change in internal pressure in the case where fuel vapor remains in the fuel tank with that in the case where no fuel vapor remains in the fuel tank.

In short, the rate of the vent passage pressure Pvt being reduced increases in the case where fuel vapor remains in the fuel tank 13, as compared with the case where no fuel vapor remains in the fuel tank 13 (see FIG. 5C). The rate of the vent passage pressure Pvt being reduced increases as the concentration of the fuel vapor increases. This causes the estimated volume Ves to be calculated as a relatively small value. In such a case, the estimated volume Ves does not reach the volume threshold Vth. As a result, in a case where the determination should result in "HAVING NO OCCLUSION," there was a risk of erroneous determination of "HAVING OCCLUSION" depending on density of the fuel vapor in the sealed space and an amount of the adsorbed fuel vapor in the canister 15.

However, the study by the present inventors has revealed that erroneous determination as described above is made only in a primary stage (first primary period) of the first occlusion diagnosis period. The reasons are that there is a limit to the amount of the adsorbed fuel vapor in the canister 15 and fuel vapor is no longer adsorbed once the adsorption amount is saturated, and that an amount of the adsorbed fuel vapor in the canister 15 is almost saturated if the density of the fuel vapor in the fuel tank 13 has been high even before the diagnosis.

In short, It has been revealed that even if the determination of "HAVING OCCLUSION" is made in the determination on occlusion in the primary period (first primary period) of the first occlusion diagnosis period, there is a case to be definitively diagnosed as having no occlusion of the vent passage 37 where the determination of "HAVING NO OCCLUSION" is made in the determination on occlusion in the primary period (second primary period) of the second occlusion diagnosis period.

<Case 3: Diagnosis resulted in HAVING OCCLUSION>

Next, chronological operation by the occlusion diagnosis device 11 in Case 3 (diagnosis resulted in HAVING OCCLUSION) will be described with reference to FIG. 4C. FIG. 4C is a time chart showing temporal transition of respective values used in the occlusion diagnosis when the vent passage pressure Pvt in a state of having occlusion is reduced by the negative pressure pump 51, in a case where the degree of influence on diagnosis accuracy given by the fuel vapor remaining in the fuel-vapor sealing system is relatively large. There are mutually common operational parts between the chronological operation in Case 2 and that in Case 3. Therefore, the description will be focused on differences between the two, to substitute description on operation in Case 3.

During a period from time t11 to time t12 in FIG. 4C, the reference exhaust rate Qref is calculated as in Case 2.

During a period from time t12 to time t15 (i.e., the first occlusion diagnosis period) in FIG. 4C, the occlusion diagnosis process is executed as in Case 2.

In the first primary period from time t12 to time t13 of the period from time t12 to time t15 (i.e., the first occlusion diagnosis period), the first estimated volume Ves_1 is calculated using the same procedure as in Case 2. The magnitude of the first estimated volume Ves_1 is compared with that of the volume threshold Vth, to make determination on occlusion of the vent passage 37. As in Case 1, the result of determination on occlusion of the vent passage 37 in the first occlusion diagnosis period is "HAVING OCCLUSION." This means that the degree of influence on accuracy of diagnosing occlusion of the vent passage 37 given by the fuel vapor remaining in the fuel-vapor sealing system is relatively large (another diagnosis is required). As a result, the determination of "DIAGNOSIS PENDING (ANOTHER DIAGNOSIS IS REQUIRED)" is made in Case 3 at time t13, as in Case 2.

In Case 3, the cumulative exhaust amount CVes exceeds the exhaust amount threshold CVth at time t14 during a period from time t12 to time t15 (first occlusion diagnosis period), as in Case 2. As a result, the degree of influence on accuracy of diagnosing occlusion of the vent passage 37 given by the fuel vapor remaining in the fuel-vapor sealing system is sufficiently small at time t14 in Case 3.

In the second primary period from time t15 to time t16 of a period from time t15 to time t17 (i.e., the second occlusion diagnosis period), the second estimated volume Ves_2 is calculated using the same calculation procedure as with the first estimated volume Ves_1. The magnitude of the second estimated volume Ves_2 is compared with that of the volume threshold Vth, to make determination on occlusion of the vent passage 37. The result of determination on occlusion of the vent passage 37 in the second occlusion diagnosis period is "HAVING OCCLUSION," as in the first occlusion diagnosis period. This means that the degree of influence on accuracy of diagnosing occlusion of the vent passage 37 given by the fuel vapor remaining in the fuel-vapor sealing system is large (another diagnosis has been made). As a result, Case 3 is diagnosed at time t16 as "HAVING OCCLUSION," in taking account of the result of the determination on occlusion of "HAVING OCCLUSION" at time t16 and the fact that the cumulative exhaust amount CVes has exceeded the exhaust amount threshold CVth.

Case 3 described above corresponds to a process flow of "No in step S13," "No in step S15," "No in step S15," "Yes in step S15," and "HAVING OCCULUSION in the vent passage 37 in step S17" in FIG. 3. Case 3 is definitively diagnosed as "HAVING OCCLUSION" at time t16 in FIG. 4C.

Advantageous Effects of Occlusion Diagnosis Device 11

Next, a description will be given of advantageous effects of the occlusion diagnosis device 11 according to the embodiment of the present invention.

The occlusion diagnosis device 11 from a first aspect of the invention (corresponding to claim 1) is presumed to be an occlusion diagnosis device applied to a fuel tank system including: the fuel tank 13 for containing fuel; the canister 15 for adsorbing fuel vapor generated in the internal space of the fuel tank 13; and the vent passage 37 communicating between the internal space of the fuel tank 13 and the canister 15, for diagnosing occlusion of the vent passage 37. The occlusion diagnosis device 11 from the first aspect includes: the information obtaining unit 65 for obtaining information on the internal pressure of the vent passage 37; the control unit (or flow rate control unit) 69 for controlling a flow rate of the fluid present in the vent passage 37, with the negative pressure pump (or negative pressure source) 51 in operation; the exhaust amount determination unit 71 for determining whether or not the cumulative exhaust amount CVes of the fluid from the fuel-vapor sealing system inclusive of the fuel tank 13 and the vent passage 37, with the negative pressure pump 51 in operation, exceeds the predetermined exhaust amount threshold CVth; and the occlusion diagnosis unit 73 for diagnosing occlusion of the vent passage 37. In an occlusion diagnosis period in which occlusion of the vent passage 37 is diagnosed (see the first and second occlusion diagnosis periods in FIG. 4B, for example), the negative pressure pump 51 is continuously operated over a predetermined unit length of time starting from activation of the negative pressure pump 51. The occlusion diagnosis unit 73 estimates a volume of the sealed space of the fuel-vapor sealing system based on a length of time (see |t12−t13|, for example), within the occlusion diagnosis period, required to reduce the internal pressure (vent passage pressure) Pvt of the vent passage 37 by an amount of the primary differential pressure Ppr, with the negative pressure pump 51 in operation, and the reference exhaust rate Qref of the fluid, and then diagnoses occlusion of the vent passage 37 based on whether or not the estimated volume Ves as a result of the estimation exceeds the preset volume threshold Vth. In the occlusion diagnosis of the vent passage 37, it is determined that the vent passage 37 is suspected of being occluded if the estimated volume Ves is equal to or less than the volume threshold Vth, while it is diagnosed that the vent passage 37 is not occluded if the estimated volume Ves exceeds the volume threshold Vth. If it is determined that the vent passage 37 of being occluded, the occlusion diagnosis of the vent passage 37 is suspended remains incomplete until the cumulative exhaust amount CVes of the fluid exceeds the predetermined exhaust amount threshold CVth.

In the occlusion diagnosis device 11 from the first aspect, the occlusion diagnosis unit 73 of the diagnosis unit 67 diagnoses occlusion of the vent passage 37, based on whether or not the estimated volume Ves, as a result of estimating the volume of the sealed space of the fuel-vapor sealing system, exceeds the volume threshold Vth. In the occlusion diagnosis of the vent passage 37, it is determined that the vent passage 37 is suspected of being occluded if the estimated volume Ves is equal to or less than the volume threshold Vth, while it is diagnosed that the vent passage 37 is not occluded if the estimated volume Ves exceeds the volume threshold Vth. If it is determined that the vent passage 37 is suspected of being occluded, the occlusion diagnosis unit 73 of the diagnosis unit 67 causes the occlusion diagnosis of the vent passage 37 to remain incomplete until the cumulative exhaust amount CVes of the fluid exceeds the exhaust amount threshold CVth.

According to the occlusion diagnosis device 11 from the first aspect, the occlusion diagnosis of the vent passage 37 remains incomplete until the cumulative exhaust amount CVes of the fluid exceeds the exhaust amount threshold CVth, if it is determined that the vent passage 37 is suspected of being occluded, to allow for diagnosing occlusion of the vent passage 37 with high accuracy, based on an estimated value of the volume of the sealed space of the fuel-vapor sealing system inclusive of the fuel tank 13 and the vent passage 37, with the influence given by the fuel vapor remaining in the fuel-vapor sealing system being reduced. Note that in the description of the occlusion diagnosis device 11 according to the embodiment of the present invention, the determination gives a tentative result, while the diagnosis gives a definitive result, so that the word "diagnosis" is defined to have larger weight than the word "determination."

In addition, the occlusion diagnosis device 11 from a second aspect of the invention (corresponding to claim 2) is the occlusion diagnosis device 11 from the first aspect, which is configured to set the exhaust amount threshold CVth based on a volume of a sealed space of the fuel-vapor sealing system.

According to the occlusion diagnosis device 11 from the second aspect, the exhaust amount threshold CVth is set based on the volume of the sealed space of the fuel-vapor sealing system, to allow the fuel vapor remaining in the sealed space of the fuel-vapor sealing system to be exhausted into the atmosphere by depressurization using the negative pressure pump 51 for diagnosing occlusion of the vent passage 37, to make the density of the fuel vapor remaining in the sealed space reduced. This results in the degree of influence on accuracy of diagnosing occlusion of the vent passage 37 given by the fuel vapor remaining in the sealed space being reduced. Therefore, this invention contributes to improving accuracy of diagnosing occlusion of the vent passage 37.

Further, the occlusion diagnosis device 11 from a third aspect of the invention (corresponding to claim 3) is the occlusion diagnosis device 11 from the first or second aspect, wherein the occlusion diagnosis unit 73 of the diagnosis unit 67 is configured to execute another diagnosis on occlusion of the vent passage 37, if it is determined that the vent passage 37 is suspected of being occluded.

According to the occlusion diagnosis device 11 from the third aspect, another occlusion diagnosis of the vent passage 37 is executed, if it is determined that the vent passage 37 is suspected of being occluded, so that the degree of influence on accuracy of diagnosing occlusion of the vent passage 37 given by the fuel vapor remaining in the sealed space of the fuel-vapor sealing system is reduced in another occlusion diagnosis. Therefore, this invention contributes to improving accuracy of diagnosing occlusion of the vent passage 37.

Furthermore, the occlusion diagnosis device 11 from a fourth aspect of the invention (corresponding to claim 4) is the occlusion diagnosis device 11 from the first or second aspect, wherein the occlusion diagnosis unit 73 of the diagnosis unit 67 is configured to repeatedly execute the occlusion diagnosis of the vent passage 37 until the cumulative exhaust amount CVes of the fluid at least exceeds the exhaust amount threshold CVth, if it is determined that the vent passage 37 is suspected of being occluded.

According to the occlusion diagnosis device 11 from the fourth aspect, the occlusion diagnosis of the vent passage 37 is repeatedly executed until the cumulative exhaust amount CVes of the fluid at least exceeds the exhaust amount threshold CVth, if it is determined that the vent passage 37 is suspected of being occluded, so that the degree of influence on accuracy of diagnosing occlusion of the vent passage 37 given by the fuel vapor remaining in the sealed space of the fuel-vapor sealing system is reduced, wherein said diagnosing occlusion is executed after the cumulative exhaust amount CVes of the fluid has exceeded the exhaust amount threshold CVth. Therefore, this invention contributes to improving accuracy of diagnosing occlusion of the vent passage 37.

Moreover, the occlusion diagnosis device 11 from a fifth aspect of the invention (corresponding to claim 5) is the occlusion diagnosis device 11 from any one of the first to fourth aspects, wherein the first and second occlusion diagnosis periods (collectively the occlusion diagnosis period) are configured to include the first and second primary periods (collectively the primary period), each having a length of time required to reduce the vent passage pressure Pvt by an amount of the primary differential pressure Ppr with the negative pressure pump 51 in operation, and the length of time of the primary period may be set shorter than that of a predetermined unit length of time of the first and second occlusion diagnosis periods (collectively the occlusion diagnosis period).

According to the occlusion diagnosis device 11 from the fifth aspect, the length of time of the first and second primary periods (collectively the primary period) is set shorter than that of the predetermined unit length of time of the first and second occlusion diagnosis periods (collectively the occlusion diagnosis period), so that a substantial length of time is shortened except for a preparation period for executing the occlusion diagnosis (see a period from time t13 to time t15 in FIGS. 4A to 4C, for example).

Other Embodiments

Hereinabove, the embodiment has been presented as an example of implementing the present invention. Then, this should not be construed as limiting the technical scope of the present invention. The reason is that the present invention can be practiced in various forms without departing from the spirit or major features thereof.

For example, the embodiment according to the present invention has been described with an example in which the sealing valve 41 is provided in the vent passage 37, but the present invention is not limited thereto. The sealing valve 41 may be dispensed with.

In addition, the embodiment according to the present invention has been described with an example in which the atmospheric pressure sensor 58 is provided, but the present invention is not limited thereto. The atmospheric pressure sensor 58 may be dispensed with. In this case, by way of utilizing the fact that the internal pressure sensor 55 detects the atmospheric pressure Patm when the switching valve 53 is switched to the communication position of allowing the canister 15 to communicate with the atmosphere (see FIG. 1B), the internal pressure sensor 55 may be configured to detect the atmospheric pressure Patm.

Further, the embodiment according to the present invention has been described with an example in which the value equivalent to the volume of the fuel-vapor sealing system is appropriately set as the exhaust amount threshold CVth, but the present invention is not limited thereto. The exhaust amount threshold CVth may be set to have an appropriate value exceeding the volume of the sealed space of the fuel-vapor sealing system, such as double or triple thereof.

Furthermore, the embodiment according to the present invention has been described with an example in which the occlusion diagnosis device 11 according to the embodiment of the present invention is applied to a hybrid vehicle inclusive of an internal combustion engine and an electric motor as the drive source, but the present invention is not limited thereto. The present invention may be applied to a vehicle having an internal combustion engine only as a power source.

What is claimed is:

1. An occlusion diagnosis device for use in a fuel tank system having a fuel tank for containing fuel, a canister for adsorbing fuel vapor generated in an internal space of the fuel tank, and a vent passage for communicating between the internal space of the fuel tank and the canister, to diagnose occlusion of the vent passage, the occlusion diagnosis device comprising:
an information obtaining unit for obtaining information on internal pressure of the vent passage;
a flow rate control unit for controlling a flow rate of fluid present in the vent passage, with a negative pressure source in operation;
an exhaust amount determination unit for determining whether a cumulative exhaust amount of the fluid from a fuel-vapor sealing system inclusive of the fuel tank and the vent passage, with the negative pressure source in operation, exceeds a predetermined exhaust amount threshold; and
an occlusion diagnosis unit for diagnosing occlusion of the vent passage,
wherein in an occlusion diagnosis period in which occlusion of the vent passage is diagnosed, the negative pressure source is continuously operated over a predetermined unit length of time starting from activation of the negative pressure source, and the occlusion diagnosis unit estimates a volume of a sealed space of the fuel-vapor sealing system based on a length of time, within the occlusion diagnosis period, required to reduce the internal pressure of the vent passage by an amount of a primary differential pressure, with the negative pressure source in operation, and an exhaust rate of the fluid, and then diagnoses occlusion of the vent passage based on whether or not the estimated volume as a result of the estimation exceeds a preset volume threshold, to determine, as a tentative result, that the vent passage is suspected of being occluded if the estimated volume is equal to or less than the preset volume threshold, while to diagnose, as a definitive result, that the vent passage is not occluded if the estimated volume exceeds the preset volume threshold, wherein if it is determined, as a tentative result, that the vent passage is suspected of being occluded, the occlusion diagnosis of the vent passage remains incomplete until the cumulative exhaust amount of the fluid exceeds the predetermined exhaust amount threshold.

2. The occlusion diagnosis device as claimed in claim 1, wherein the predetermined exhaust amount threshold is set based on said volume of the sealed space of the fuel-vapor sealing system.

3. The occlusion diagnosis device as claimed in claim 2, wherein the occlusion diagnosis unit is configured to execute another diagnosis on occlusion of the vent passage, if it is determined that the vent passage is suspected of being occluded.

4. The occlusion diagnosis device as claimed in claim 3, wherein
the occlusion diagnosis period includes a primary period, having the length of time required to reduce the internal pressure of the vent passage by the amount of the primary differential pressure, and
the length of time of the primary period is set shorter than that of the predetermined unit length of time of the occlusion diagnosis period.

5. The occlusion diagnosis device as claimed in claim 2, wherein the occlusion diagnosis unit is configured to repeatedly execute the occlusion diagnosis of the vent passage until the cumulative exhaust amount of the fluid exceeds the predetermined exhaust amount threshold, if it is determined, as a tentative result, that the vent passage is suspected of being occluded.

6. The occlusion diagnosis device as claimed in claim 5, wherein
the occlusion diagnosis period includes a primary period, having the length of time required to reduce the internal pressure of the vent passage by the amount of the primary differential pressure, and
the length of time of the primary period is set shorter than that of the predetermined unit length of time of the occlusion diagnosis period.

7. The occlusion diagnosis device as claimed in claim 2, wherein
the occlusion diagnosis period includes a primary period, having the length of time required to reduce the internal pressure of the vent passage by the amount of the primary differential pressure, and
the length of time of the primary period is set shorter than that of the predetermined unit length of time of the occlusion diagnosis period.

8. The occlusion diagnosis device as claimed in claim 1, wherein the occlusion diagnosis unit is configured to execute another diagnosis on occlusion of the vent passage, if it is determined that the vent passage is suspected of being occluded.

9. The occlusion diagnosis device as claimed in claim 8, wherein
the occlusion diagnosis period includes a primary period, having the length of time required to reduce the internal pressure of the vent passage by the amount of the primary differential pressure, and
the length of time of the primary period is set shorter than that of the predetermined unit length of time of the occlusion diagnosis period.

10. The occlusion diagnosis device as claimed in claim 1, wherein the occlusion diagnosis unit is configured to repeatedly execute the occlusion diagnosis of the vent passage until the cumulative exhaust amount of the fluid exceeds the predetermined exhaust amount threshold, if it is determined, as a tentative result, that the vent passage is suspected of being occluded.

11. The occlusion diagnosis device as claimed in claim 10, wherein
the occlusion diagnosis period includes a primary period, having the length of time required to reduce the internal pressure of the vent passage by the amount of the primary differential pressure, and
the length of time of the primary period is set shorter than that of the predetermined unit length of time of the occlusion diagnosis period.

12. The occlusion diagnosis device as claimed in claim 1, wherein
the occlusion diagnosis period includes a primary period, having the length of time required to reduce the internal pressure of the vent passage by the amount of the primary differential pressure, and
the length of time of the primary period is set shorter than that of the predetermined unit length of time of the occlusion diagnosis period.

* * * * *